Dec. 25, 1962 S. J. NEEDS ETAL 3,070,411
KINGSBURY TYPE THRUST BEARING ASSEMBLY FOR CONCENTRIC SHAFTS
Filed Feb. 19, 1962
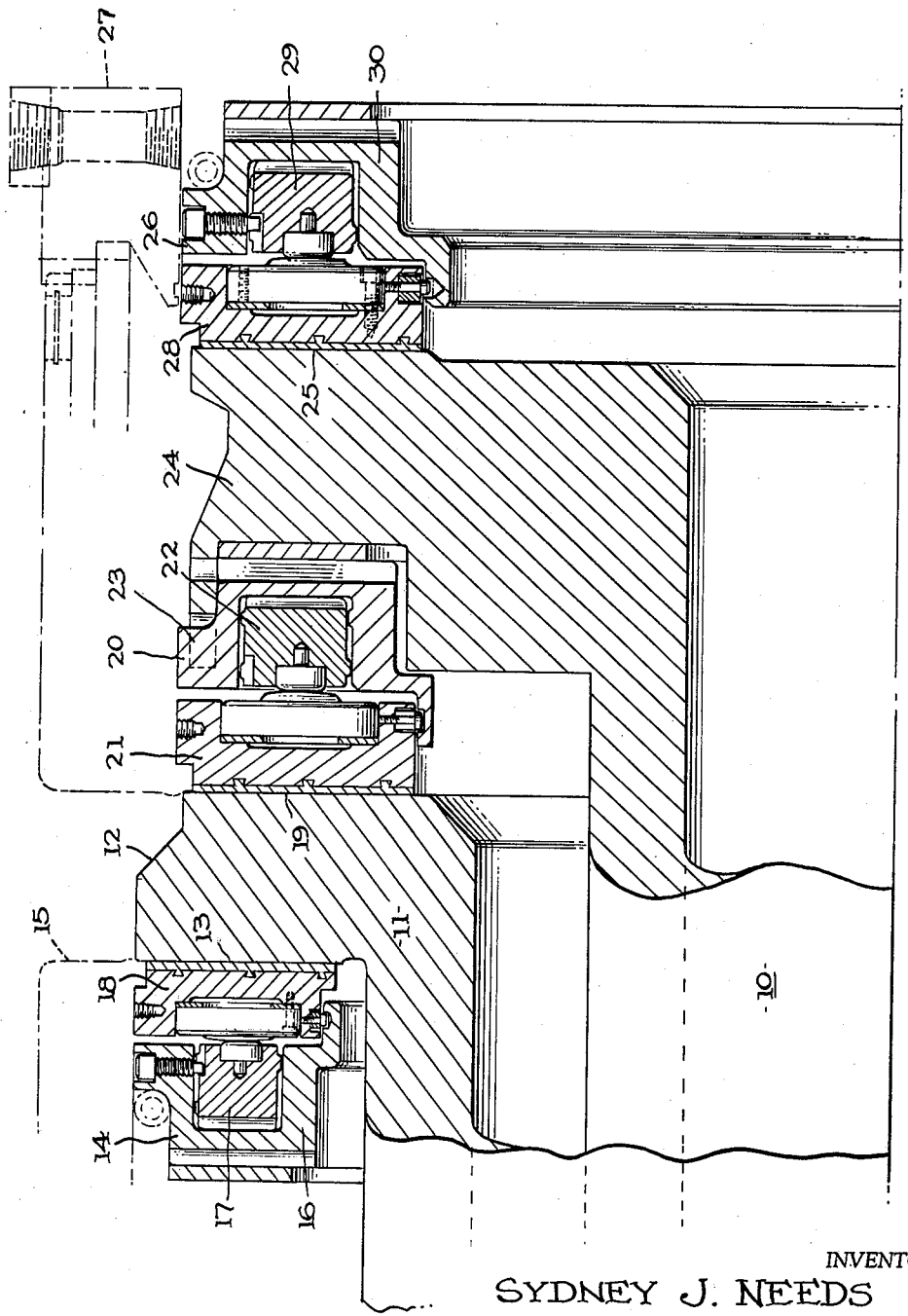
INVENTORS
SYDNEY J. NEEDS
JOSEPH CORBY, JR.
BY
Cameron, Kerkam + Sutton
ATTORNEYS

United States Patent Office 3,070,411
Patented Dec. 25, 1962

3,070,411
KINGSBURY TYPE THRUST BEARING ASSEMBLY FOR CONCENTRIC SHAFTS
Sydney J. Needs and Joseph Corby, Jr., Philadelphia, Pa., assignors to Kingsbury Machine Works, Inc., Philadelphia, Pa., a corporation of Delaware
Filed Feb. 19, 1962, Ser. No. 173,991
2 Claims. (Cl. 308—160)

This invention relates to Kingsbury type thrust bearings and more particularly to such thrust bearing assemblies for concentric shafts.

Even more particularly this invention relates to Kingsbury type thrust bearing assemblies for concentric shafts which may rotate at the same or at different speeds.

Kingsbury type thrust bearings are well known in which the thrust is received by a plurality of bearing shoes disposed about the circumference of a base ring and cooperating with a bearing surface on a collar on the shaft, the several bearing shoes being supported in the base ring by leveling plates or by filler plates. In the case of concentric shafts rotating at the same or at different speeds a distinct problem is presented in receiving the thrust in both directions from both shafts while maintaining the size of the thrust bearing assembly within reasonable limits and keeping friction and power losses to a minimum.

The obvious solution to Kingsbury type thrust bearing assembly for concentric shafts would be the provision of a thrust collar on each shaft with a Kingsbury type thrust bearing on each side of each collar to receive endwise thrust in either direction from each shaft. This would require four Kingsbury type thrust bearings which would make the overall bearing assembly size quite large and would increase power losses due to friction as well as increase the cost of the entire bearing assembly.

The present invention provides a novel solution to the problem by providing the outer shaft with a thrust collar having opposed bearing surfaces one surface cooperating with a Kingsbury type thrust bearing mounted against rotation in the bearing housing while the other bearing surface cooperates with a Kingsbury type thrust bearing mounted on a runner carried by the inner shaft and rotating with the runner, the runner having an opposed bearing surface cooperating with a third Kingsbury type thrust bearing mounted against rotation in the bearing housing. In this construction the first Kingsbury type thrust bearing has a greater diameter than the diameters of the second and third Kingsbury type thrust bearings which preferably have equal diameters. This construction utilizes three Kingsbury type thrust bearings in place of four reducing the overall size of the bearing assembly and minimizing power losses due to friction and at the same time reducing the cost of the bearing assembly. The shafts can rotate at the same or at different speeds without impairment of the operation of the thrust bearing assembly.

It is therefore the object of the present invention to provide a novel Kingsbury type thrust bearing assembly for concentric shafts employing three Kingsbury type thrust bearings, two of these bearings being mounted in the bearing housing against rotation and the third being carried for rotation by the inner of the concentric shafts.

It is another object of the present invention to provide such a bearing assembly which is relatively compact and reduces power losses due to friction.

Another object is to provide such a bearing assembly in which the shafts can rotate at the same or at different speeds without impairment of the function of the bearing assembly.

Other and further objects of the present invention will appear from the following description of an illustrative embodiment thereof.

The bearing assembly of the present invention is capable of various mechanical embodiments one of which is shown in the accompanying drawing and is described hereinafter to illustrate the concept. This embodiment should in no way be construed as defining or limiting the invention.

In the illustrative embodiment shown in the drawing, 10 is the inner shaft concentric with outer shaft 11 and rotating at the same speed as or at different speeds from shaft 11. Shaft 11 is provided with thrust collar 12 having an annular bearing surface 13. A conventional Kingsbury type thrust bearing is mounted opposite bearing surface 13 and is generally indicated at 14. Bearing 14 is mounted against rotation in the bearing housing generally indicated at 15. Bearing 14 comprises a base ring 16 supporting conventional leveling plates 17 which in turn and in known manner support a plurality of bearing shoes 18 in thrust receiving engagement with bearing surface 13.

Thrust collar 12 is provided with a second bearing surface 19 parallel to surface 13. A second Kingsbury type thrust bearing generally indicated at 20 is disposed opposite surface 19 and has conventional Kingsbury type bearing shoes 21 in engagement therewith. Shoes 21 are carried by leveling plates 22 which are mounted in conventional manner in base ring 23. Base ring 23 is mounted in runner 24 formed on shaft 10 for rotation with runner 24. Kingsbury type thrust bearing 20 therefore rotates at the same speed as runner 24.

Runner 24 is provided with bearing surface 25 disposed parallel to bearing surfaces 13 and 19. A third Kingsbury type thrust bearing 26 is mounted in the bearing housing, generally indicated at 27, opposite bearing surface 25. Kingsbury type bearing shoes 28 of bearing 26 engage bearing surface 25 and are supported in conventional manner by leveling plates 29 which are mounted in base ring 30. Base ring 30 is fixed in position in housing 27.

Thrust bearing 14 is of gerater diameter than bearings 20 and 26 with bearings 20 and 26 preferably having the same diameter. It is to be understood that thrust bearings 14, 20, and 26 can be of any desired diameter having any suitable number of bearing shoes.

It should be apparent from the description above that the bearing assembly shown in the drawing is so disposed that bearing 14 absorbs endwise thrust to the left of shaft 11 and absorbs endwise thrust to the left of shaft 10 through thrust bearing 20. Thrust bearing 26 receives endwise thrust to the right of shaft 10 and receives endwise thrust to the right of shaft 11 through thrust bearing 20. It is also clear that shafts 10 and 11 can rotate at the same or at different speeds without impairing the action of the bearings.

It should now be apparent that the several objectives discussed above are attained by the present invention.

Changes in or modification to the above described illustrative embodiment of the present invention may now be suggested to those skilled in the art without departing from the inventive concept. Reference should therefore be had to the appended claims to determine the scope of this invention.

What is claimed is:

1. In a Kingsbury type thrust bearing assembly, an inner shaft, an outer shaft concentric therewith, a thrust collar on said outer shaft, opposed parallel bearing surfaces on said collar, a fixed Kingsbury type thrust bearing cooperating with one of said surfaces, a runner on said inner shaft, a Kingsbury type thrust bearing mounted on and for rotation with said runner and cooperating with the other of said bearing surfaces, a third bearing surface on said runner parallel to said first-named surfaces, and a fixed Kingsbury type thrust bearing cooperating with said third bearing surface.

2. In a bearing assembly as described in claim 1, said first Kingsbury type thrust bearing having a larger diameter than said second and third Kingsbury type thrust bearings, said second and third bearings having equal diameters.

References Cited in the file of this patent

UNITED STATES PATENTS

| | | |
|---|---|---|
| 1,459,454 | Trotter | June 17, 1923 |
| 2,507,021 | Lakey | May 9, 1950 |